Feb. 7, 1961 R. E. IMUS ET AL 2,970,348

TERMITE POISON APPLICATOR

Filed Oct. 13, 1958

2 2
1
3
4
2

2 8
7
SLEEVE
3 3
1
POISON CORE
6
6
12
5
6
4

12 6
1

1 10
12

1 12

1
9
4

2
16
1
4

15
13
NAIL
16 2 14
1
6
12
17
5

ROBERT E. IMUS
EVERETT E CRAUDER
INVENTOR.

BY Lyon & Lyon
ATTORNEYS

United States Patent Office 2,970,348

Patented Feb. 7, 1961

2,970,348

TERMITE POISON APPLICATOR

Robert E. Imus, 893 Woodland Drive, Sierra Madre, Calif., and Everett E. Crauder, 314 Linwood Ave., Monrovia, Calif.

Filed Oct. 13, 1958, Ser. No. 766,918

3 Claims. (Cl. 21—73)

This invention relates to termite poison applicators, and included in the objects of this invention are:

First, to provide a termite poison applicator which may be readily applied in the course of erecting a wooden frame of a house, or other structure, with a minimum of additional labor and expense.

Second, to provide a termite poison applicator which utilizes a conventional nail, and does not interfere with the use of the nail for its normal purpose, namely, to secure members of a frame together.

Third, to provide a termite poison applicator which ensures distribution of poison deep into a frame structure in the probable path of a subsequent infestation of termites so that should an infestation start, its progress is soon halted and the infestation killed by poison.

Fourth, to provide a termite poison applicator which, although particularly suited for new construction, is also applicable in old construction merely by driving the applicator and an appropriate nail into strategic locations.

With the above and other objects in view, as may appear hereinafter, reference is directed to the accompanying drawings in which.

Figures 1, 2, 3, 4, 5, 6, 7, 8, 9:
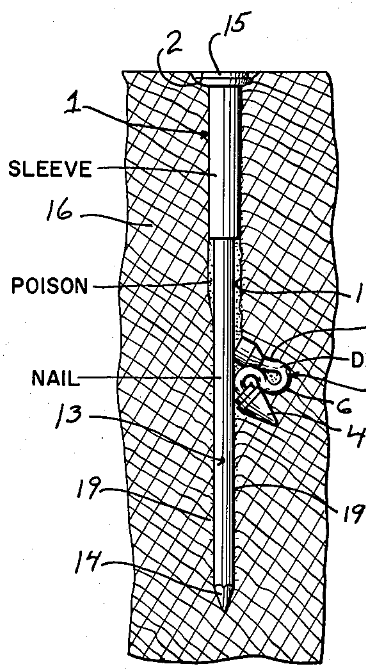
Figure 1 is a side view of the termite poison applicator.
Figure 2 is an enlarged, longitudinal, sectional view thereof taken through 2—2 of Figure 1.
Figure 3 is a transverse sectional view through 3—3 of Figure 2.
Figures 4 and 5 are transverse sectional views similar to Figure 3, showing modified cross sections of the core member.
Figure 6 is a further enlarged, fragmentary, sectional view through 6—6 of Figure 2.
Figure 7 is a fragmentary view of a body of wood showing the termite applicator driven therein, in the initial step of applying the poison.
Figure 8 is a similar view showing the point of the applicator partially extended into the body of wood by a nail.
Figure 9 is a similar view showing the nail driven completely into the body of wood, and indicating the manner in which the core of the applicator is collapsed and deflected.

The termite poison applicator includes a cylindrical sleeve 1 having an externally flanged end 2. Fitted within the sleeve 1 is a core member 3 which comprises a pointed tip 4 reduced at its unpointed end to fit within the sleeve 1 and form a shoulder 5 so that the tip 4 abuts the corresponding end of the sleeve.

Joined to the pointed tip 4 is a stem 6 which extends concentrically through the sleeve 1 and terminates in a plug or piston element 7. The piston element is normally positioned a short distance within the flanged end 2 of the sleeve 1 and is provided with a conical socket 8 adapted to receive the point of a nail. In order to secure the core member 3 within the sleeve 1, the pointed tip 4 may be provided with an annular groove 9 adjacent the shoulder 5, and the confronting end of the sleeve 1 may be inturned to fit the groove 9, as shown in Fig. 6.

The stem 6 may be circular in cross section, as shown in Figures 2, 3, 8, and 9, or may be formed by three radiating webs 10, as shown in Figure 4, or may be a single diametrically extending web 11, as shown in Figure 5. In any case, the shape and cross section of the stem 6 is such that it is capable of crushing or bending after issuance from the sleeve, as will be described hereinafter.

The stem 6 and the sleeve 1 define a chamber which is filled with a termite poison 12. The tip end 4 and plug 7 may fit sufficiently tight within the sleeve to seal the poison therein. In addition, or alternatively, the assembled applicator with the poison therein may be dipped or coated with a suitable sealing material.

The sleeve 1 is adapted to receive, pistonwise, a nail 13 having the usual pointed end 14 and a head 15.

The termite poison applicator is used as follows:

The assembled applicator unit is driven as a nail into a body of wood 16, as shown in Figure 7; thereupon a conventional nail of the proper diameter is inserted so as to engage and fit within the socket 8 of the plug 7. The nail is then driven pistonwise through the sleeve 1, forcing the core member 3 ahead. Initially, the pointed tip 4 tends to form a cavity 17 equal in diameter to the sleeve 1, but eventually the stem of the core collapses, as indicated by 18 in Figure 9.

The nail, after it is driven further into the body of wood, carries with it and distributes poison along the surface of the hole formed by the nail, as indicated by 19 in Figure 9. I will thus be observed that the poison is discharged from the sleeve 1 and carried by the nail well into the body of wood.

The nail may be used to perform the function of connecting frame members together, such as the frame members of a house, or the like. That is, for example, the termite poison applicator may be driven slantwise into the bottom or top end of a stud, and the nail driven therethrough and into the underlying or overlying bottom or top plate of a housing frame. Also rafters may be fastened to the top plate in a similar manner; still further, subflooring may be joined to rafters—to mention only a few of the several ways in which the termite poison applicator may be used. Sufficient applicators are used in the construction of a housing frame, or the like, to block serious infestation of termites.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A termite poison applicator adapted for cooperation with a nail, comprising: a rigid tubular shell adapted to contain a poison; a core element including a pointed end closing one end of said shell, a piston closing the other end thereof, and a collapsible stem extending therebetween; said pointed end cooperating with said shell whereby said shell may be driven into a body of wood; said core and poison adapted to be driven from said shell by a nail and said core tending to collapse to permit further penetration of the nail into the body of wood.

2. A termite poison applicator adapted for cooperation with a nail, comprising: a cylindrical sleeve having a flange at one end; and a core member including a pointed end capping the end of said sleeve opposite from said flange end, a stem extending through said shell, and a plug at the other end of said stem recessed within said sleeve and having a nail-receiving socket; said core member and sleeve defining a poison-containing chamber; said sleeve and core member adapted to be driven into a body of wood and thereafter receive said nail piston-wise to drive said core member and poison from said sleeve to permit further penetration of said nail into the body of wood.

3. A termite poison applicator adapted for cooperation with a nail, comprising: a rigid tubular shell adapted to contain a poison; a pointed element closing one end of said shell; a piston element closing the other end thereof; said pointed element cooperating with said shell whereby said shell may be driven into a body of wood; said piston element adapted to be driven by a nail through said shell, and both said piston element and pointed element adapted to be driven from said shell by said nail to transport said poison into the body of wood.

References Cited in the file of this patent

UNITED STATES PATENTS

| | | |
|---|---|---|
| 1,428,111 | Molesworth | Sept. 5, 1922 |
| 1,856,809 | Gibson | May 21, 1932 |
| 1,999,458 | Hollister | Apr. 30, 1935 |
| 2,173,966 | Jackson | Sept. 26, 1939 |

FOREIGN PATENTS

| | | |
|---|---|---|
| 687,333 | France | Aug. 7, 1930 |